United States Patent [19]

Ugro, Jr.

[11] Patent Number: 4,879,175

[45] Date of Patent: Nov. 7, 1989

[54] DEVICE FOR EXPOSING COLORANT TO BE TRANSFERRED

[75] Inventor: Josef V. Ugro, Jr., Mahtomedi, Minn.

[73] Assignee: Minnesota Mining and Manufacturing Company, St. Paul, Minn.

[21] Appl. No.: 807,855

[22] Filed: Dec. 11, 1985

[51] Int. Cl.$^4$ .......................... A61K 7021; A61K 9/70; B32B 3/26

[52] U.S. Cl. .................................. 428/321.5; 264/4.7; 424/63; 424/401; 428/207; 428/212; 428/402.2; 428/402.21; 428/914; 252/315.2

[58] Field of Search ................................ 346/207, 213; 428/321.5, 201; 252/315.2; 424/63, 401

[56] References Cited

U.S. PATENT DOCUMENTS

| | | | |
|---|---|---|---|
| 2,932,582 | 4/1960 | Pesa et al. | 117/36 |
| 3,016,308 | 1/1962 | Macaulay | 428/327 X |
| 3,930,101 | 12/1975 | Vincent | 428/326 |
| 3,954,666 | 5/1976 | Marquisee et al. | 252/430 |
| 4,307,169 | 12/1981 | Matkan | 430/111 |
| 4,450,221 | 5/1984 | Terada et al. | 430/106.6 |
| 4,487,801 | 12/1984 | Turnbull et al. | 428/313.5 |
| 4,564,534 | 1/1986 | Kushida et al. | 428/321.5 X |

*Primary Examiner*—Richard D. Lovering
*Attorney, Agent, or Firm*—Donald M. Sell; Walter N. Kirn; Mark A. Litman

[57] ABSTRACT

Dispersions of solid, non-magnetic particulate pigments in a polymeric shell provide a colorant medium.

7 Claims, No Drawings

DEVICE FOR EXPOSING COLORANT TO BE TRANSFERRED

BACKGROUND OF THE INVENTION

1. Field of the Invention

The present invention relates to the microencapsulation of dispersed pigments and other colorant materials and to microcapsules containing such dispersed colorants.

2. Background of the Art

It is fairly common to find encapsulated liquid materials in the marketplace. Technology has been available for many years to effectively provide microcapsules with liquid oleophilic ingredients. Representative processes are shown in U.S. Pat. Nos. 3,016,308 and 3,516,941. These patents disclose in situ polymerization reactions in which a hydrophobic oil phase is dispersed in an aqueous phase containing resin precursors, particularly aminoplast resin precursors (to form urea/aldehyde resins and the like). High shear agitation is used to keep the capsule size small. Addition of an acid catalyst initiates the polycondensation of the aminoplast precursors, resulting in the deposition of the aminoplast resin about the dispersed droplets of the oil phase. This produces the microcapsules.

Other polycondensation encapsulation techniques are shown in U.S. Pat. Nos. 3,429,827 and 4,000,087. These particular techniques are more limited in the classes of hydrophobic inner phases acceptable in the microcapsules because of reaction with the oil soluble monomer or poor solubility of the monomer in the desired hydrophobic phase.

U.S. Pat. No. 3,930,101 teaches that, to be retained in the hydrophobic phase during high shear dispersion of a fluid particulate dispersion, it is necessary that the particulate be preferentially wetted by the hydrophobic phase. It is suggested to use suitable surfactants which adsorb to the particulate surface as a way to achieve the desired preferential wetting. It has, however, been recognized that, in the in situ polymerization of aminoplast resins method for encapsulation, the presence of surfactants interferes with the deposition of the aminoplast resin at the hydrophobic phase/water phase interface, giving poorly formed or leaky capsules. Similarly, oil soluble suspending agents could alter the wetting of many particulates. Since many of these materials contain carboxylate groups, exposure to highly acidic medias often converts them to carboxylic acid groups altering their adsorbability to the particulates.

U.S. Pat. No. 4,307,169 teaches the inclusion of magnetic materials into a pressure fixable core material within a shell formed by interfacial polycondensation.

U.S. Pat. No. 3,954,666 teaches the preparation of semipermeable microcapsules containing catalysts and ferromagnetic materials.

U.S. Pat. No. 4,450,221 teaches magnetic toners comprising lyophilic magnetic particles and a resin surrounded by a resin wall to form microcapsules. Colorants such as pigments or dyes may be included in the wall forming resin or the toner. The magnetic particles are rendered lyophilic by treatment with a titanate or silane coupling agent. The coupling agent is said to uniformly disperse the particles in the binder resin and firmly bond the magnetic particle to the resin.

BRIEF DESCRIPTION OF THE INVENTION

Solid non-magnetic dispersions of colorant materials are encapsulated in resins by in situ polymerization. Surface modifying agents are used in the polymerization reaction environment to control the relative wettability of the solids by the organic and aqueous phases. Control of this relative wettability enables the deposition of smooth, relatively fault-free shells and can be used to control the location of pigments within the microcapsule structure.

DETAILED DESCRIPTION OF THE INVENTION

In accordance with the present invention, microcapsules are prepared by in situ such as aminoplast polymerization. The techniques disclosed, generally referred to as an in situ polymerization reaction, yield, for example, an aminoplast resin capsule wall material. In the process, a hydrophobic oil phase is dispersed in an aqueous phase containing the aminoplast resin precursors by applying high shear agitation. Addition of an acid catalyst initiates the polycondensation of the aminoplast precursors, resulting in the deposition of the aminoplast resin about the dispersed droplets of the oil phase, producing the microcapsules.

Pigments of various types, when dispersed in water insoluble oils, and then mixed or dispersed under high shear into water phases to produce oil in water dispersions, will show a variety of behaviours depending upon the surface characteristics of the pigment particles relative to the oil and water phases. In particular, pigment particles which are wetted by the water phase and incompletely or poorly wetted by the oil phase, will readily move from the oil phase to the water phase during this dispersion process. Attempts to encapsulate such a pigment will generally be unsuccessful and lead to a capsule containing few, if any, pigment particles. Pigment particles which are completely wetted by the oil phase and incompletely or poorly wetted by the water phase will tend to remain in the interior of the oil phase droplets during the dispersion process. Pigment particles of this type will generally result in microcapsules having the pigment particles in the oil core of the microcapsule with relatively few particles being abstracted from the oil phase or caught or immobilized in the microcapsule shell wall. Finally, pigment particles which are incompletely wetted by either the oil phase or by the water phase will be found concentrated at the oil/water interface during such a dispersion process. Microcapsules formed from this type of pigment will give capsules having the pigment particles more or less in the shell wall of the microcapsule. The ability to alter the surface characteristics and more particularly the wetting characteristics of pigment particles relative to the chosen oil and water phase compositions provides the means to control the encapsulatability of pigment dispersions and the means to control the ultimate location of the majority of the pigment particles within the microcapsule (i.e., either freely dispersed in the core oil phase or fixed at or within the microcapsule shell wall). Useful products can be made from microcapsules containing pigments of either of the two types.

The present invention describes a process whereby the surface of non-magnetic colorant particulates, by the addition of surface adsorbable agents, are rendered oleophilic and can maintain their oleophilicity in water (at pH's encountered in encapsulation processes). This may mean pH's of 10 or more for some interfacial encapsulation processes or pH 4-1.8 for in-situ aminoplast encapsulation. The additive must remain on the surface of the particle for a period of at least five minutes at a pH representative of the most extreme pH to be encountered in the encapsulation process under the following conditions:

1. The oil phase used as the interior phase of the capsule (e.g., diethyl phthalate) is placed in the same flask with the pigment. The pigment is either pretreated with the additive or the pigment is treated in-situ by incorporation of additive into the oil phase.

2. One part of the oil phase dispersion to ten parts of an aqueous phase at the required pH are combined in a flask.

3. The combination in the flask is shaken vigorously for at least five (and preferably ten) minutes. The phases are microscopically examined to determine the location of the pigment. If at least 20%, preferably no more than at least 10%, and no more than at least 5% of the pigment is in the water phase (unassociated with oil phase), the additive has failed.

This test procedure defines the functional ability of an oleophilic additive according to the present invention. Any material that passes this test (no more than 20% in the water phase) is referred to as a functional oleophilic additive.

It has been found that two main classes of pigment surface modifying agents are particularly useful for controlling the wetting characteristics of a variety of pigment types. These materials are usually described as titanate or silane coupling agents. Judicious selection of the coupling agents from these classes allows the control of the encapsulatability and particulate location of a variety of pigment types, associated with a variety of different oil phase compositions. Three methods for the use of these surface modifying agents are possible depending upon the specific agent chosen and on other restrictions dictated by the microcapsule use. They are:

1. Pretreatment of the pigment particles prior to dispersion in the oil phase.

2. Addition of the coupling agent directly to the oil phase of the pigment dispersion.

3. Having the coupling agent present in the water phase at the time of dispersing of the oil/pigment dispersion.

The first process is the most universally useful as the pretreatments are usually accomplished by exposure of the pigments to solutions of the coupling agents. Selection of solvents according to the nature of the coupling agent is more readily accomplished. For example, the preferred solvent, and sometimes the required solvent, for use with many of the silane coupling agents is water. In other cases, the solubility of a chosen coupling agent in the desired oil phase for encapsulation may not be satisfactory for effective pigment treatment, or it may be undesirable to have free coupling agent present in the oil phase of the encapsulated pigment dispersion. Treatment of the pigment in solutions of 0.05% to 10% of the coupling agent will usually produce acceptable results, with 0.25% to 2.0% being most desirable.

The second method is restricted to coupling agents of the two classes that have solubility in the oil phase composition to be used in the microcapsule. Usually an excess of the coupling agent over that necessary for the surface treatment of the pigment will be used. This will result in some residual soluble coupling agent present in the oil/pigment dispersion. The addition of 0.05% to 5% by weight of the particulate will usually produce acceptable results.

The third method is restricted to those coupling agents which are soluble in water. It is most useful with pigments which are wettable by water. Additions of 0.05% to 10% of the coupling agent by weight of the particulate will usually produce acceptable results, with 0.25% to 2.0% being the most desired range.

Pigments as used in the present invention refer exclusively to solid materials. Dyes or pigments carried in solid polymeric or waxy phases can constitute pigments in the present invention, but dyes dissolved in liquid media are not solids and therefore not within the definition of pigments.

Chemisorption of the additives to the particulates is preferred, but not essential. Adsorption of the additives to the particulates (e.g., pigments) by Van der Waals forces, dipole-dipole attraction, or hydrogen bonding are also useful. Chemisorption requires an actual chemical bond to be formed between a part of the additive and the particulate surface. The pigments for which this process is most useful are those which have hydrophilic surfaces initially and require increased oleophilicity of their surfaces. The pigments may be a single, solid particulate, colorant materials carried in a solid medium or colloidal materials which in gross or bulk form appear gelatinous (e.g., colloidal, hydrated iron oxide) and thus act as a solid.

Titanate coupling agents that are illustrative of those used in the present invention as agents to modify the wettability of the particulates have formulas shown in Table I.

TABLE I

1. Isopropyl triisostearoyl titanate
2. Isopropyl methacryl diisostearoyl titanate
3. Isopropyl dimethacryl isostearoyl titanate
4. Isopropyl tridodecylbenzenesulfonyl titanate
5. Isopropyl diacryl isostearoyl titanate
6. Isopropyl tri(dioctylphosphato) titanate
7. Isopropyl 4-aminobenzenesulfonyl di(dodecylbenzenesulfonyl) titanate
8. Isopropyl trimethacryl titanate
9. Isopropyl tricumylphenyl titanate
10. Isopropyl di(4-aminobenzoyl) isostearoyl titanate
11. Isopropyl tri(dioctylpyrophosphato) titanate
12. Isopropyl triacryl titanate
13. Isopropyl tri(N—ethylamino-ethylamino) titanate
14. Isopropyl tri(2-aminobenzoyl) titanate
15. Isopropyl tri(butyl, octyl pyrophosphato) titanate di(dioctyl, hydrogen) phosphate
16. Di(butyl, methyl pyrophospato) isopropyl titanate di(dioctyl, hydrogen) phosphite
17. Titanium isostearate methacrylate oxyacetate
18. Titanium acrylate isostearate oxyacetate
19. Titanium dimethacrylate oxyacetate
21. Titanium di(cumylphenylate) oxyacetate
22. Titanium di(dioctylpyrophosphate) oxyacetate
23. Titanium diacrylate oxyacetate
24. Titanium di(butyl, octyl pyrophosphate) di(dioctyl, hydrogen phosphite) oxyacetate
25. Diisostearoyl ethylene titanate
26. Di(dioctylphosphato) ethylene titanate
27. 4-aminobenzenesulfonyl dodecylbenzenesulfonyl ethylene titanate
28. Di(dioctylpyrophosphato) ethylene titanate
29. Di(butyl, methyl pyrophosphato)ethylene titanate di(dioctyl, hydrogen phosphite)
30. Tetraisopropyl di(dioctylphosphito) titanate
31. Tetraoctyloxytitanium di(ditridecylphosphite)
32. Tetra(2,diallyoxymethyl-1 butoxy titanium di(di-tridecyl) phosphite The above listed titanate coupling agents are commercially available.

Illustrative silane coupling agents have the formulas below:

RSiX$_3$

RR'SiX$_2$
RR'R"SiX

Where X is Cl, alkoxy of 1-4 carbon atoms (e.g. OCH$_3$, OC$_2$H$_5$) alkoxy ethers (e.g., [O(CH$_2$)$_n$O(CH$_2$)$_m$CH$_3$]- where n is 1 to 4, and m is 0 to 4) or OCH$_2$CH$_2$O CH$_3$ and R, R', R' are alkyl or substituted alkyls (e.g., of 1 to 20 carbon atoms and allowing for ether linkages), aryls or substituted aryl (e.g., of 6 to 20 carbon atoms) vinyl, acrylate or methacrylate groups. Substituted alkyls include, but are not limited to:

NH$_2$—CH$_2$CH$_2$NH—CH$_2$CH$_2$CH$_2$—

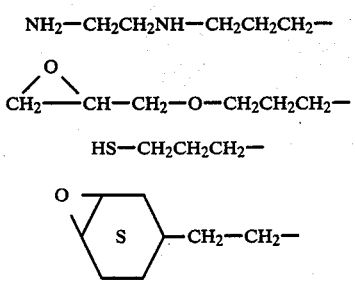

HS—CH$_2$CH$_2$CH$_2$—

These coupling agents are commercially available.

The particulates or pigments useful in the present invention are preferably finely divided materials having particle sizes of less than 25 microns and preferably less than 10 microns and most preferably less than 2 microns. Suitable materials are non-magnetic titanium, iron, aluminum, chromium, copper and cobalt oxides, water insoluble materials such as barium sulfate, a variety of silicates, silica, talcs, carbon black, micas and treated micas, phthalocyanine complexes, and particularly essentially oil and water insoluble cosmetic colorants.

The hydrophobic inner phase for the capsule may be any in situ aminoplast encapsulatable composition as discussed in U.S. Pat. No. 3,516,941. The material or the dispersion produced by incorporation of the particulate may be fluid, semi-solid (e.g., gel), waxy or low melting (less than 100° C.) solid carrier phase. Typical materials may be fragrance oils, mineral oils, emollients such as isopropyl myristate, plasticizers such as the phthalate esters, waxes such as found in lipsticks, etc.

When the microcapsule is prepared by interfacial polycondensation, the capsule skin may be composed of any condensation polymer or addition polymer, e.g., polyamide, polyurethane, polysulfonamide, polyurea, polyester, polycarbonate, etc. Polyamides prepared by interfacial polycondensation of an amine with an acid chloride or polymers formed by reaction of isocyanate prepolymer with polyamines are preferred. Microcapsules formed by coacervation processes are also useful in forming microcapsule shells according to the present invention. Coacervation is the well known process of forming higher molecular weight gelatin polymers as taught in U.S. Pat. Nos. 2,800,458 and 2,800,457.

The preferred use of these capsules is in sampling devices wherein colors can be deposited on other surfaces. For example, the capsules can be coated with a binder onto a carrier surface. The capsules are ruptured by conventional means and the color transferred to a second surface by rubbing. Organic polymeric binders are preferably used, but natural binders such as gelatin, gum arabic and sap can be used. The sheet material samplers can be made by blending the capsules into a diluted (with solvent) binder and then coating of all or a portion of the carrier surface.

Conventional rupturing means can be finger nails, pencils, blunt edges, a scraper or the like. Newer, but now conventional means for rupturing capsules is disclosed in U.S. Pat. No. 4,487,801. In the present case, a device for exposing colorant material for transfer to another surface comprises at least two sheets bound by a single layer of a non-pressure sensitive adhesive composition layer. The adhesive composition layer contains the microcapsules of the present invention. The cohesive strength of the adhesive composition layer is less than the strength of the bond between said adhesive composition and said sheets, and the tensile rupture strength of the microcapsules is less than the cohesive strength of the adhesive composition.

The capsules used in these constructions and generally in the practice of the present invention have average diameters between 4 and 100 microns. Preferably the average diameters are between 10 and 80 microns. The capsules preferably constitute from 20 to 98% by volume or weight of the adhesive composition layer, most preferably between 50 and 85% by weight or volume of said adhesive composition layer.

EXAMPLES

Example 1

An aminoplast precondensate solution composed of 12.13% urea, 32.40% formaldehyde solution (37% formaldehyde by weight) 0.11% potassium tetraborate and 55.36% water was cooked for 2.5 hours at 160° F. A pigment dispersion was made by grinding 81.4g of Pfizer High Purity Red Pigment R-1599HP into 122.5g diethyl phthalate. A second pigment dispersion was prepared as above except that 0.82g of isopropyl tri(dioctylpyrophosphato) titanate (ITPT) was added. Two encapsulations were run by mixture of 175 ml of precondensate solution, 500 ml of water and the pigment dispersions in baffled reactors with high shear agitation, acidifying to pH 2.0 and holding for 2 hours. The temperature was then raised to 140° F. and held for 2 hours. The moisture was neutralized to pH 7 with a sodium hydroxide solution. With the pigment dispersion containing to titanate coupling agent, the result was capsules containing only diethyl phthalate, with the pigment residing in the aqueous phase, unassociated with the capsules or the interior oil phase, whereas the capsules made with the pigment dispersion containing ITPT had essentially complete retention of the pigment within the diethyl phthalate, inside the capsules. When the capsules were isolated and dried they gave a free flowing colored powder. When this powder was applied to the skin and rubbed gently, capsules ruptured and gave significant coloration to the skin. The color was readily distributed to give even toning of the skin. When the capsule slurry was mixed with a polyvinyl alcohol solution and coated onto paper and dried and this coating was rubbed on the skin color transfer readily occurred giving good color toning of the skin.

Example 2

A series of encapsulations were run as above with Titanox 1000, a hydrophilic titanium dioxide pigment, untreated and pretreated with various coupling agents prior to dispersing in a fluid composed of cyclohexane, diethyl phthalate and tributyl phosphate. The coupling agents tested were phenyltrimethoxysilane, methylphenyldimethoxysilane, isopropyl tri(dioctylphosphato) titanate (ITDT) and ITPT. With no coupling agent added, essentially all the Titanox was found in the water phase, unassociated with the capsule or interior oil phase. With the pretreated Titanox, the material was predominantly found within the oil phase within the capsule in all four cases.

Example 3

An encapsulation was run with the solvent composition of Example 2, with the addition of untreated Titanox 1000 and an amino functional trimethoxy silane, to the water phase of the encapsulation mixture. At the conclusion of the encapsulation, capsules looking like "snowballs" were formed, having the Titanox particles immobilized in the aminoplast shell wall. With a colored fill, some opacification and masking of the color was noticeable.

Example 4

Encapsulations have been run with a diethyl phthalate oil phase containing ITPT and variously colored iron oxide pigments, chromium oxide pigments, copper oxide pigments with similar results to those of Example 1.

Example 5

Encapsulation of surface treated magnetite. Neoalkoxy dodecylbenzenesulfonyl titanate was used as the surface treatment material and has the following structure:

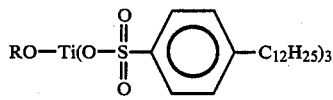

wherein R is an alkyl group.

The surface treatment was performed by ball milling a slurry containing 66.2% toluene, 0.7% of the titanate and 33.1% colored iron oxide for 12 hours. The iron oxide was filtered, washed with fresh toluene and air dried. A 55% (wt) surface treated iron oxide slurry in toluene was encapsulated with the following procedures.

An aminoplast precondensate solution composed of 12.13% urea, 32.40% formaldehyde solution (37% formaldehyde by weight), 0.10% triethanolamine and 55.37% water was cooked for 2.5 hours at 160° F. A one liter baffled reactor with a Waring blender mixer was charged with the following:

| Charge | Weight (gms) |
| --- | --- |
| Precondensate | 413 |
| Water | 310 |
| Gelvatol 40-10 (Polyvinyl Alcohol) | 0.25 |
| NaCl | 50 |
| 55% surface treated iron oxide in toluene | 165 |

The pH was decreased from 4.0 to 1.8 with a 10% HCl solution during a two hour polymerization period.

The capsule slurry was heated to 140° F. for 2.5 hours to cure the capsule walls. The slurry was neutralized to pH 8 with 10% NaOH. All of the colored iron oxide was encapsulated and the capsules were unagglomerated.

Example 5 can be repeated with other pigments such as chromium oxide, zinc oxide, titanium oxide and coper oxide with equivalent results.

I claim:

1. A device for exposing a colorant so as to enable said colorant to be transferred to a surface, said device comprising
   (1) at least two sheets bound by a single layer of a non-pressure sensitive adhesive composition layer,
   (2) said adhesive composition layer containing a microcapsule of a dispersion of solid non-magnetic colorant material in a gel, waxy or low-temperature melting solid carrier phase encapsulated within a polymeric shell characterized by the fact that the surface of the solid material has adsorbed thereon a second material which increases the oleophilicity of the surface of the solid colorant material, and
   (3) said microcapsules having an average diameter between 4 and 100 micrometers, the cohesive strength of the adhesive composition layer being less than the strength of the bond between said adhesive composition and said sheets, and the tensile rupture strength of said microcapsules being less than the cohesive strength of the adhesive composition.

2. The device of claim 1 wherein said flexible sheets are selected from the group consisting of paper and polymeric film.

3. The device of claim 2 wherein said microcapsules have an average diameter between 10 and 80 micrometers.

4. The device of claim 2 wherein said colorant is in a waxy or solid carrier.

5. The device of claim 1 wherein said microcapsules have an average diameter between 10 and 80 micrometers.

6. The device of claim 1 wherein said microcapsules comprise from 50 to 85% by weight of said adhesive composition layer.

7. The device of claim 1 wherein said colorant is in a waxy or solid carrier phase.

* * * * *

UNITED STATES PATENT AND TRADEMARK OFFICE
CERTIFICATE OF CORRECTION

PATENT NO. : 4,879,175
DATED : November 7, 1989
INVENTOR(S) : Ugro

It is certified that error appears in the above-identified patent and that said Letters Patent is hereby corrected as shown below:

Column 8, line 17, "coper" should be --copper--.

Signed and Sealed this

Fourteenth Day of May, 1991

Attest:

HARRY F. MANBECK, JR.

*Attesting Officer*  *Commissioner of Patents and Trademarks*